United States Patent [19]
Lundell et al.

[11] Patent Number: 5,358,191
[45] Date of Patent: Oct. 25, 1994

[54] STORAGE AND SPLICING OF STRIP MATERIAL

[75] Inventors: Dennis A. Lundell, Uniontown; John P. Roman, Cuyahoga Falls; Michael W. Smith, Mogadore, all of Ohio

[73] Assignee: The Goodyear Tire & Rubber Company, Akron, Ohio

[21] Appl. No.: 755,752

[22] Filed: Sep. 6, 1991

[51] Int. Cl.$^5$ ............................................. B65H 19/18
[52] U.S. Cl. .................................................... 242/556
[58] Field of Search ............... 242/58.1, 58.2, 58.3, 242/58.4, 58.5, 58.6

[56] References Cited

U.S. PATENT DOCUMENTS

| | | | |
|---|---|---|---|
| 3,065,923 | 11/1962 | Karr | 242/58.3 |
| 3,551,252 | 1/1968 | Bishop et al. | 156/406 |
| 3,843,482 | 5/1973 | Wireman et al. | 156/350 |
| 3,844,871 | 10/1974 | Habert et al. | 156/362 |
| 4,261,786 | 4/1981 | Martin et al. | 156/406 |
| 4,392,912 | 7/1983 | Horsley | 242/58.5 X |
| 4,402,467 | 9/1983 | Kentz | 242/58.3 X |
| 4,543,149 | 9/1985 | Abe et al. | 242/58.1 X |
| 4,586,672 | 5/1986 | King et al. | 242/56 R |
| 4,708,300 | 11/1987 | Goetz | 242/58.1 |
| 4,792,372 | 12/1988 | Alexander et al. | 156/394.1 |
| 4,881,695 | 11/1989 | Beisswanger | 242/58.4 |

*Primary Examiner*—Daniel P. Stodola
*Assistant Examiner*—John P. Darling
*Attorney, Agent, or Firm*—T. P. Lewandowski; Frederick K. Lacher

[57] ABSTRACT

Strip material is stored in stock rolls on cassettes positioned in side by side relationship and moveable on a carriage between different roll storage positions and a splicing position. Each cassette has a guide member engageable with a guide member on a stationary support for splicing a leading edge of strip material from one roll to a trailing edge of strip material from another roll. A single actuating cylinder and shaft on the stationary support moves the guide members together providing splicing of strip material on all the rolls.

10 Claims, 7 Drawing Sheets

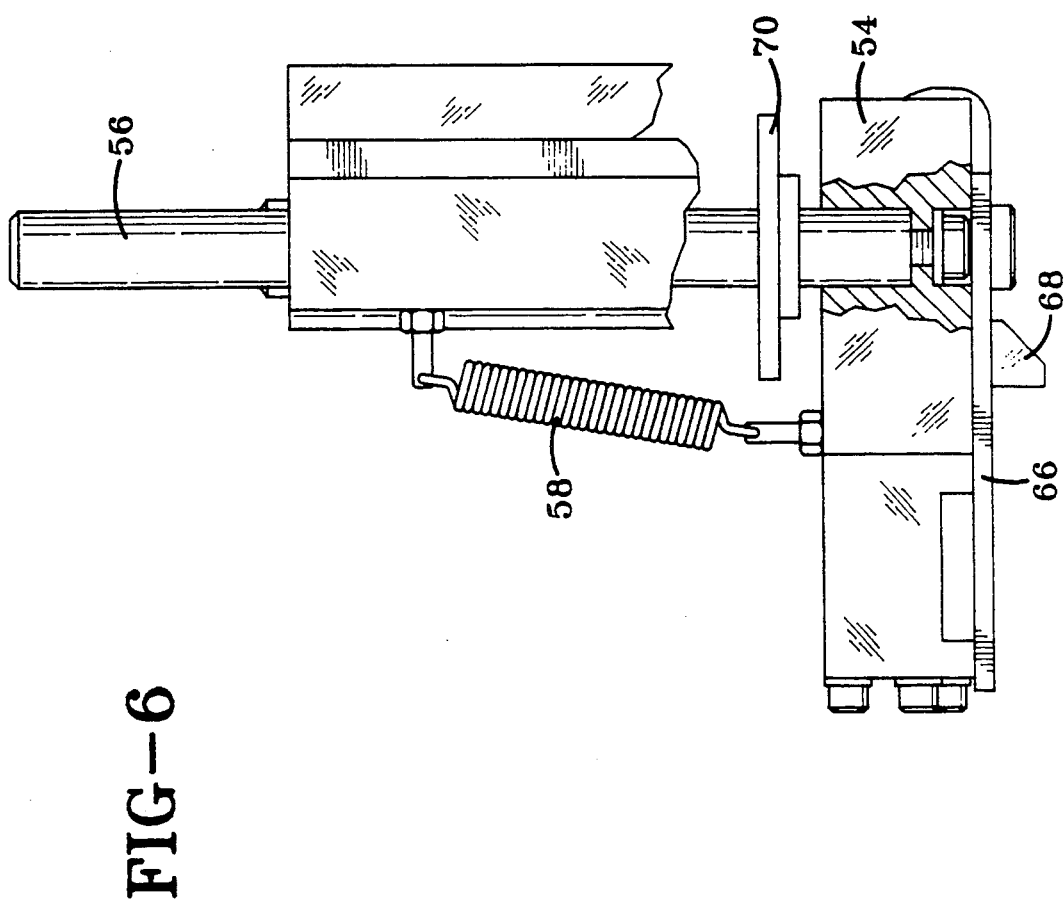

STORAGE AND SPLICING OF STRIP MATERIAL

This invention relates to a strip material storage and splicing apparatus and method and especially to the feeding and splicing of spiral overlay strips of stock such as nylon cord. In the building of tires, it is desirable to provide a continuous strip of stock to an overlay applier (not shown) without requiring manual splicing of the leading edge of material from a new roll of material to a trailing edge of material from an empty roll. Heretofore, an operator was required to be present for replacing empty rolls with full rolls and manually splicing the ends at the time a roll was emptied.

With the apparatus and method of this invention, the splicing is automatic and the operator can load a number of rolls of strip material in the side by side cassettes on a carriage after which the apparatus will automatically supply a continuous strip of material until all the rolls are empty. The operator can also replace empty rolls with full rolls while the apparatus is running giving him or her more freedom to fully utilize the operator's time. This facilitates the production of high quality products.

In accordance with one aspect of the invention, there is provided apparatus for splicing a leading edge of a first spool of strip material to a trailing edge of a second spool of strip material to provide a continuous supply of strip material comprising:

(a) a stationary support;

(b) a first supporting frame on which said first spool is mounted being moveable between a full spool storage position, an empty spool storage position, and a splicing position adjacent the stationary support;

(c) a second supporting frame on which the second spool is mounted being moveable between the full spool storage position, the empty spool storage position and the splicing position adjacent the stationary support;

(d) the first supporting frame and the second supporting frame being positioned in side by side relationship with the first supporting frame in the full spool storage position and the second supporting frame in the splicing position;

(e) guide members for holding the trailing edge of the second spool and the leading edge of the first spool in position for splicing;

(f) a first one of the guide members being on the stationary support adjacent the second supporting frame in the splicing position for holding the trailing edge;

(g) a second one of the guide members being mounted on the first supporting frame for holding the leading edge; and (h) means for moving one of the guide members towards the other of the guide members to urge the leading edge of the first spool of strip material into splicing engagement with the trailing edge of the second spool of strip material and then away from the other of the guide members for releasing the splice between the leading edge of the first spool of strip material and the trailing edge of the second spool of strip material.

In accordance with another aspect of the invention there is provided a method of splicing a leading edge of a first spool of strip material to a trailing edge of a second spool of strip material comprising:

(a) mounting the first spool on a first supporting frame in a full spool storage position;

(b) mounting the second spool on a second supporting frame in a splicing position with the first supporting frame being in side by side relationship with the second support frame;

(c) releaseably fastening the leading edge of the first spool of strip material to a frame guide member mounted on the first supporting frame;

(d) rotating the second spool and positioning the trailing edge of the second spool of strip material on a support guide member mounted on a stationary support in the splicing position;

(e) moving the second supporting frame from the splicing position into an empty spool storage position and moving the first supporting frame into the splicing position with the frame guide member spaced from the support guide member;

(f) moving the frame guide member and the support guide member together to bring the leading edge into splicing engagement with the trailing edge; and (g) moving the frame guide member and the support guide member apart to permit movement of the spliced strip material.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts, can be modified in numerous ways within the spirit and scope of the invention defined in the claims hereof.

In the annexed drawings:

FIG. 6 is a partially fragmented side view of the moveable guide member taken along line 6—6 in FIG. 5 with parts being broken away.

Figure 1:
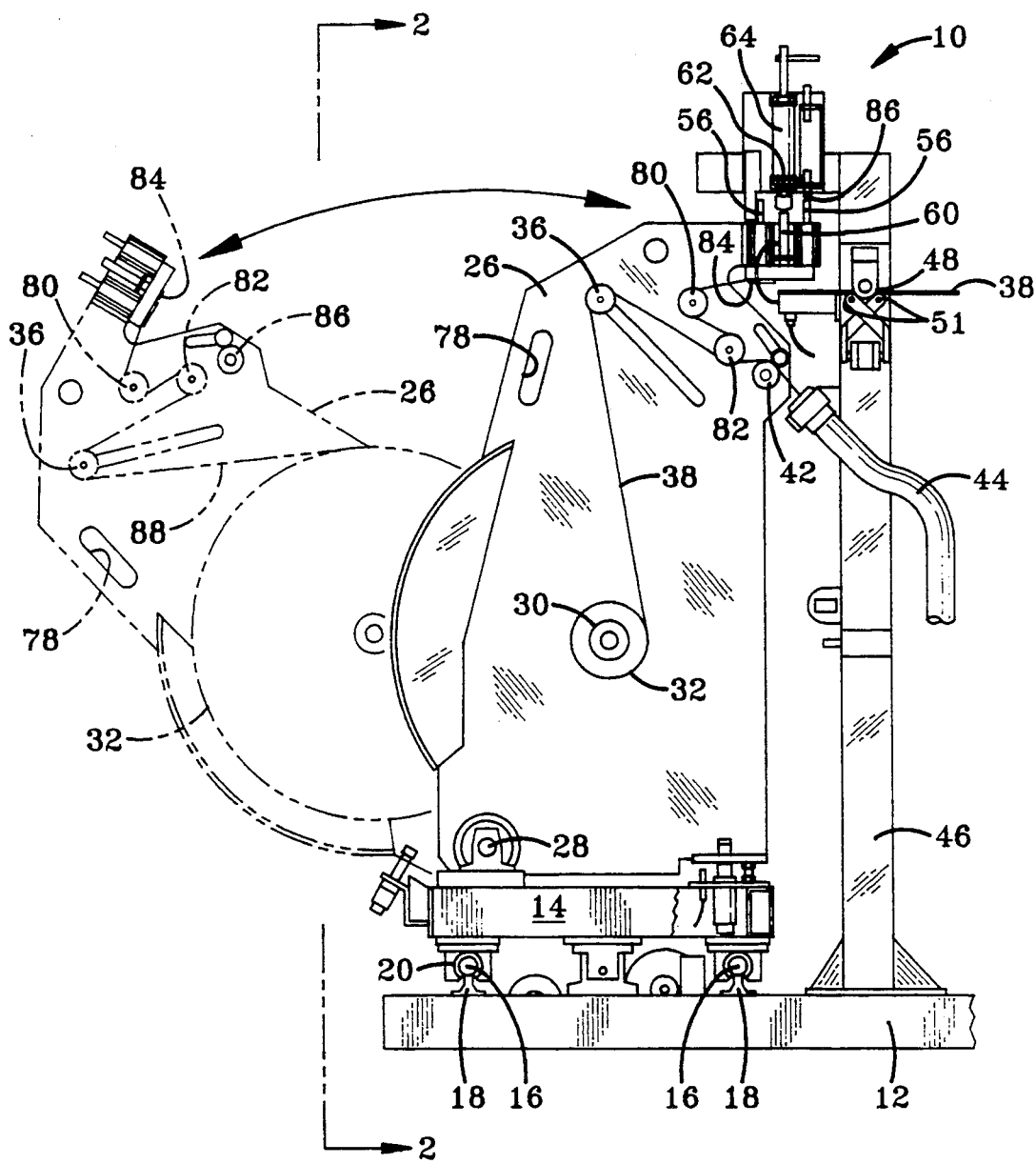
FIG. 1 is an end elevation of a roll storage and splicing apparatus embodying the invention showing an end cassette in the splicing position and showing the same cassette in the loading position with a full stock roll 32 in chain dotted lines.
Figure 2:
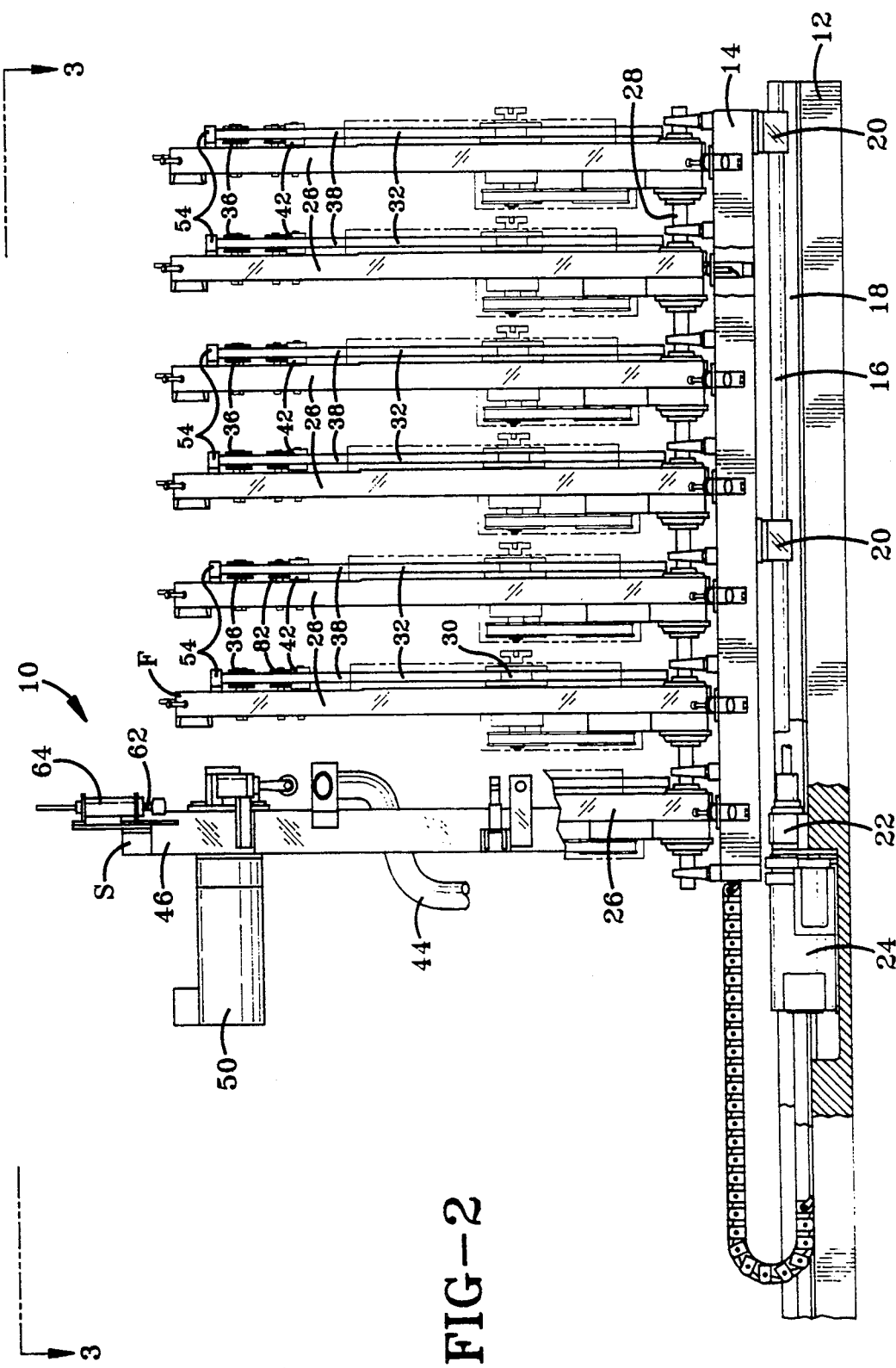
FIG. 2 is a front elevation of the apparatus with part of the base being broken away.
Figure 3:
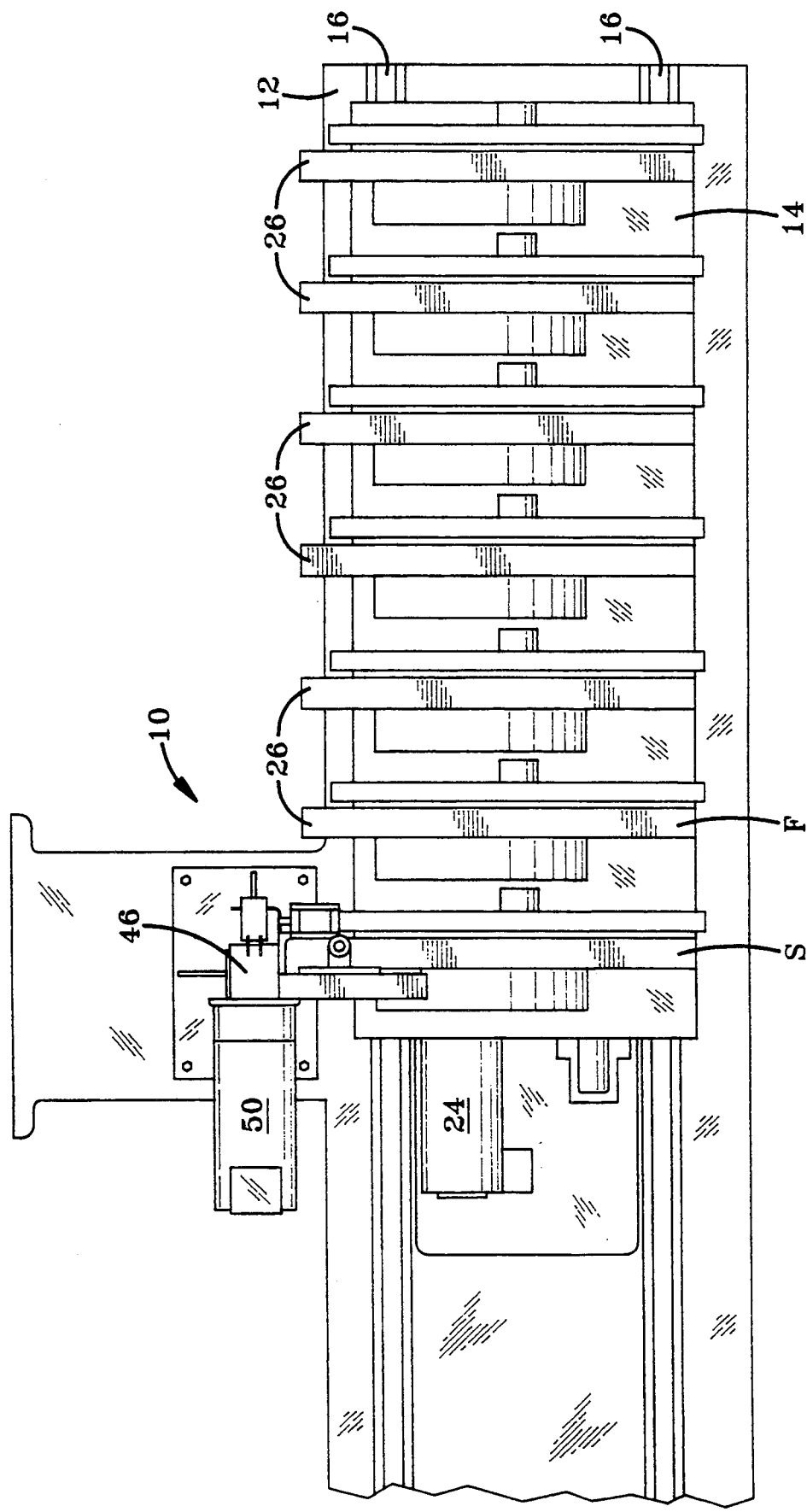
FIG. 3 is a schematic plan view of the apparatus taken along line 3—3 in FIG. 2.
Figure 4:
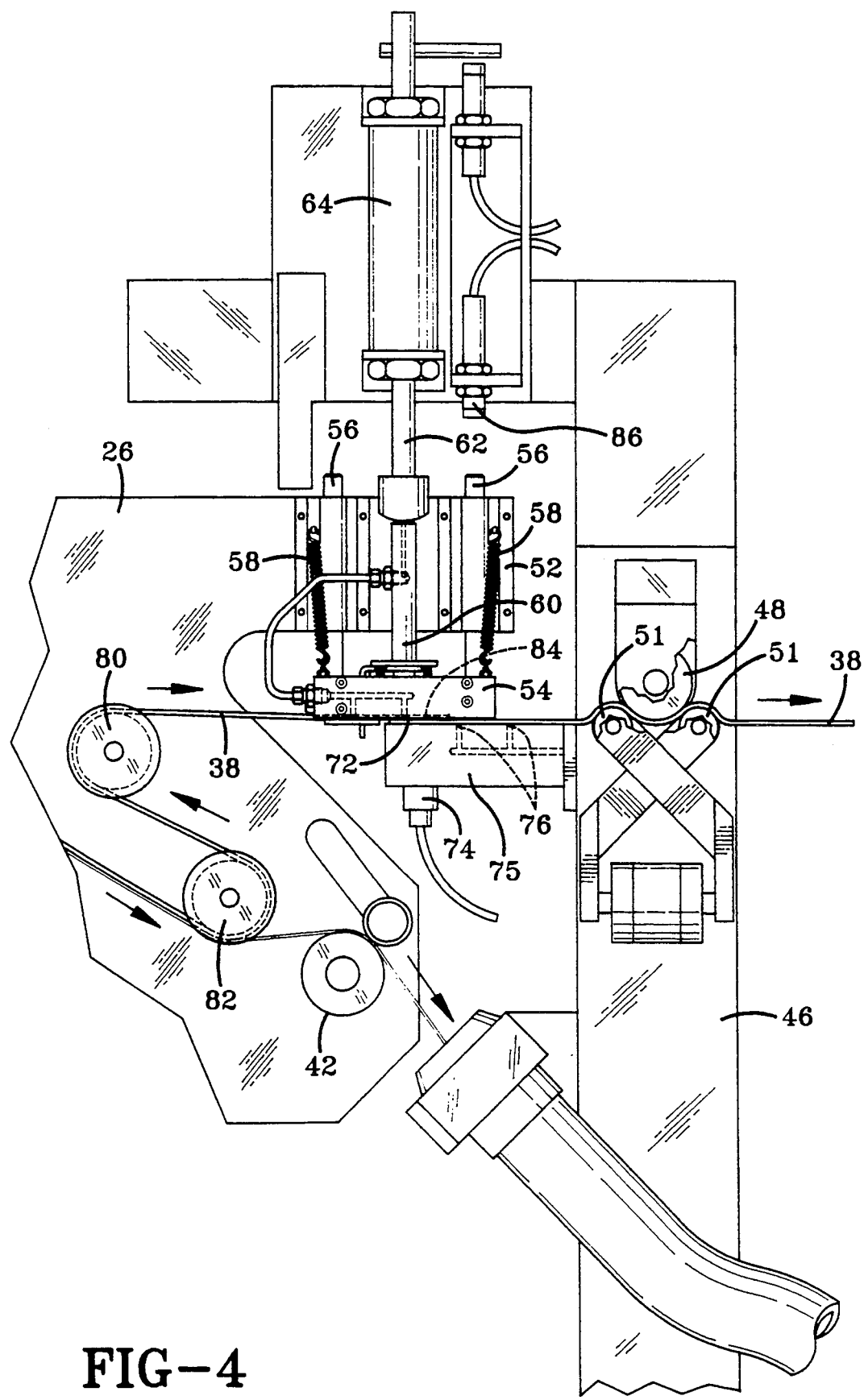
FIG. 4 is an enlarged fragmentary end elevation like FIG. 1 showing the splicing apparatus in the splicing position.
Figure 5:
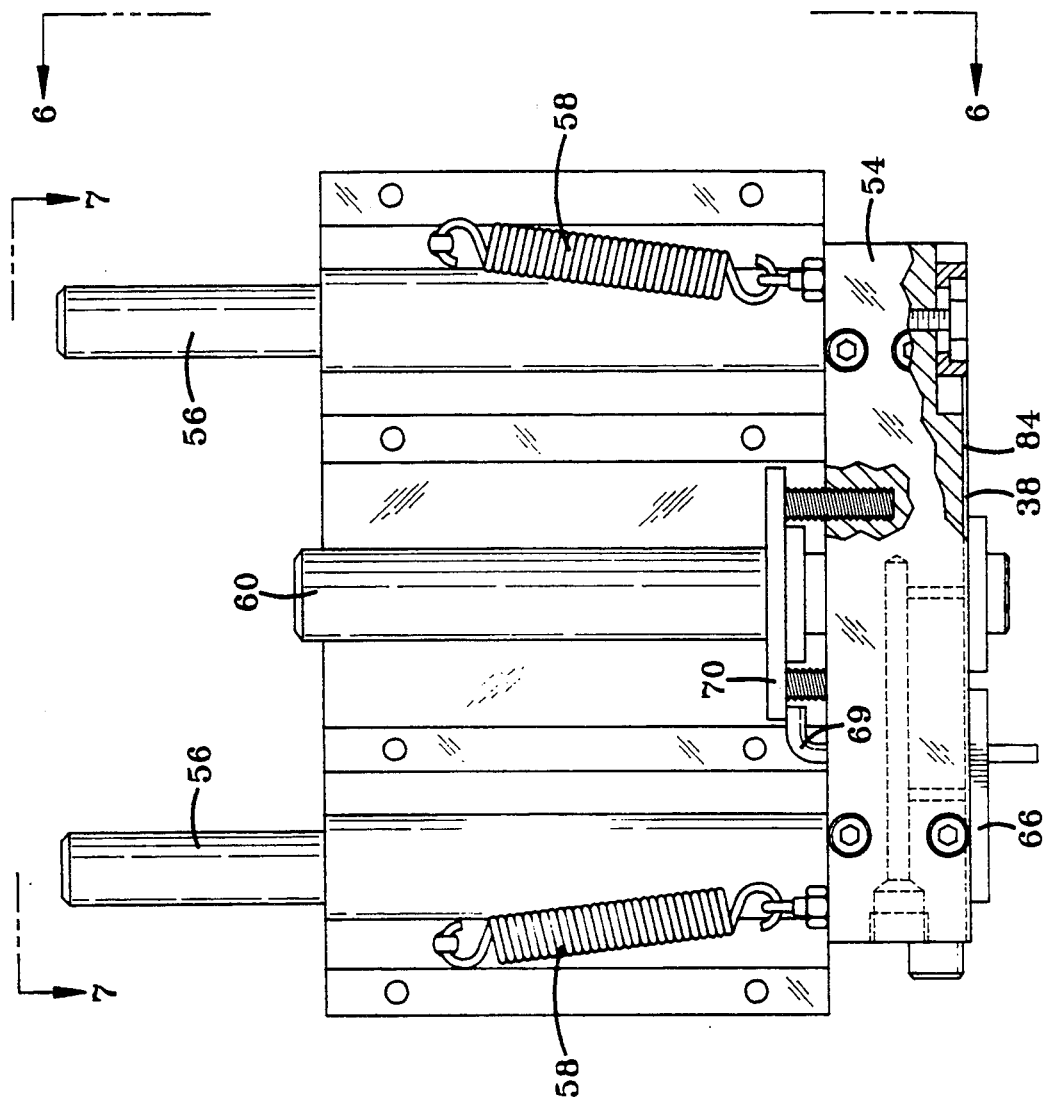
FIG. 5 is a detailed elevation of the moveable guide member.
Figure 8:
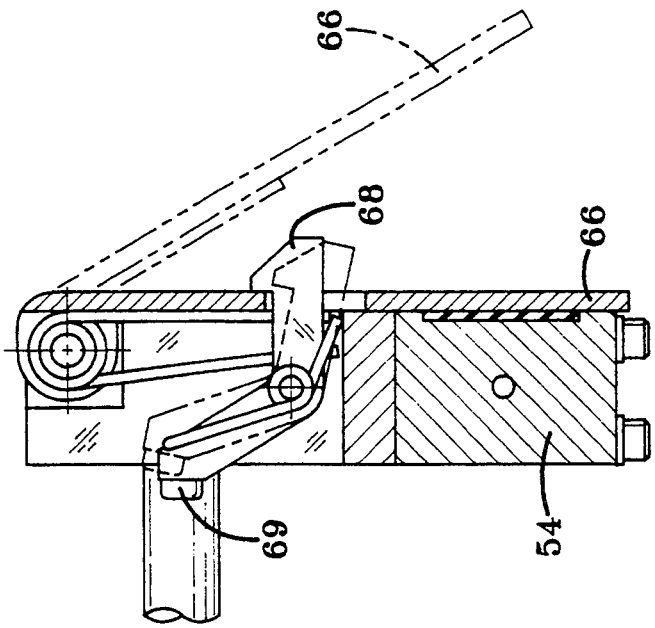
FIG. 8 is a sectional view taken along line 8—8 in FIG. 7.
Figure 7:
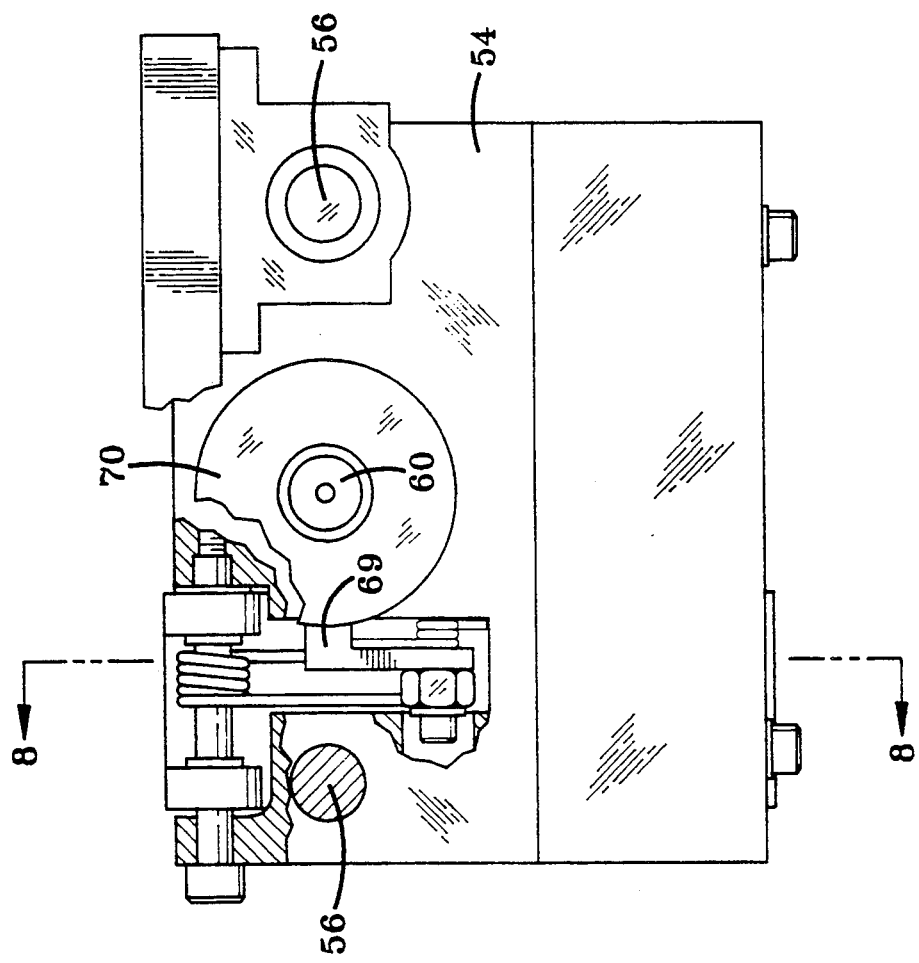
FIG. 7 is a plan view of the moveable guide member taken along line 7—7 in FIG. 5 with parts being broken away.

Referring to FIGS. 1, 2, and 3, a storage and splicing apparatus 10 is shown having a base 12 supporting an indexing carriage 14 on shafts 16. Shaft supports 18 are mounted on the base 12 and bearing pillow blocks 20 are mounted on the carriage 14. A ball screw assembly 22 mounted on the base 12 and driven by a motor 24 is connected to the indexing carriage 14 for positioning the carriage.

Supporting frames such as cassettes 26 are mounted in side by side relation on the carriage 14. Each of the cassettes 26 is pivotally mounted on a common shaft 28 secured to the indexing carriage 14 to permit pivoting of the cassettes to positions similar to that position shown in dot-dash lines in FIG. 1 so that the cassettes can be loaded and unloaded.

Each of the cassettes 26 has a spindle 30 for mounting a spool such as a stock roll 32. Each of the cassettes 26 also has a spring loaded dancer roll 36 to take up mild fluctuations in the let off tension. Strip material 38 on the stock roll 32 may have a liner 40 of polyethylene or other suitable material to prevent sticking of the overlapping layers on the stock roll. A stripper roll 42 may be provided on each of the cassettes 26 to direct the liner 40 to a hose 44 for carrying the liner away from the cassettes.

A stationary support such as fixed post 46 is mounted on the base 12 at a position adjacent one of the cassettes 26 in a splicing position "S." The fixed post 46 has a drive roll 48 connected to a DC drive motor 50 for pulling the strip material 38 from the stock rolls 32 of each of the cassettes 26 in the splicing position "S." Air actuated gripper rolls 51 press the strip material 38 against the drive roll 48.

Mounted on each of the cassettes 26 is an automatic splicer 52 shown in greater detail in FIGS. 4 through 8. A moveable guide member 54 is mounted on rods 56 slideably mounted on the end of each of the cassettes 26. Springs 58 fastened to the moveable guide member 54 and the cassette hold the guide member in the retracted position shown in FIG. 1 and actuating pin 60 on the moveable guide member 54 is engageable by a shaft 62 of an actuating cylinder 64 mounted on the post 46. The guide member 54 has a spring loaded clamp arm 66 shown more clearly in FIG. 6, 7, and 8 for holding a leading end of strip material 38. A latch 68 is released by a pin 69 engaging a flange 70 mounted on the pin 60.

Suitable detection of the diameter of the strip material remaining in the stock roll 32 may be provided by an ultrasonic sensor and when it is determined the roll is nearly empty, the let off speed is decreased. Once the roll 32 is empty, a trailing edge 72 is sensed by a photo-eye sensor 74 and an air brake is applied to hold the motor 50 and position the trailing edge on a fixed guide member 75 mounted on the fixed post 46. A vacuum may be applied to the opening 76 in the face of the fixed guide member 75 to hold the trailing edge 72 in position.

In operation, each of the cassettes 26 is grasped by a handle 78 and pivoted out to a loading position similar to that shown in dot-dash lines in FIG. 1. A full roll 32 of strip material 38 is loaded in each of the cassettes 26 and the strip material wound around guide pulleys 80, 82 and spring loaded dancer roll 36 with a leading edge 84 clamped against the moveable guide member 54 by clamp arm 66. The stock roll 32 is wound backwards to remove all slack and add an initial tension. A drag brake (not shown) may be provided for each of the cassettes 26 to maintain this position. The loose end of the liner 40 is torn off to leave an exposed end of approximately 3 inches (7.62 centimeters) hanging from stripper roll 42. Each of the cassettes 26 is then moved back into operating position.

The strip material 38 on the first of the cassettes 26 to be used is manually released from the moveable guide member 54 and threaded through the drive roll 48 then as the strip material on the stock roll 32 is used up, the diameter of the roll will decrease as has been explained hereinabove. The trailing edge 72 will then be positioned on the fixed guide member 75. The indexing carriage 14 will then be automatically indexed to the next full cassette 26 moving the empty cassette to an empty storage position and the full cassette to the splicing position "S" from a full storage position "F" as shown in the FIGS. 2 and 3. Once the full cassette 26 is in the splicing position "S" the air cylinder 64 pushes the actuating pin 60 down and urges the moveable guide member 54 against the fixed guide member 75 to make the splice of the leading edge 84 to the trailing edge 72. At the same time, the latch pin 69 is actuated to release the clamp arm 56. The air cylinder 64 retracts the shaft 62 and the apparatus is ready to supply a new roll 32 of strip material 38. A proximity switch 86 which indicates when the moveable guide member is fully retracted may be used to insure clearance before the drive motor 50 and drive roll 48 begin to pull the strip material 38 from the cassette 26.

While a certain representative embodiment and details have been shown for the purpose of illustrating the invention, it will be apparent to those skilled in the art that various changes and modifications may be made therein without departing from the spirit or scope of the invention.

What is claimed is:

1. Apparatus for splicing a leading edge of a firs spool of strip material to a trailing edge of a second spool of strip material to provide a continuous supply of strip material comprising;

(a) a stationary support;

(b) a first supporting frame on which said first spool is mounted being moveable between a full spool storage position, an empty spool storage position, and a splicing position adjacent said stationary support;

(c) a second supporting frame on which said second spool is mounted being moveable between said full spool storage position, said empty spool storage position and said splicing position adjacent said stationary support;

(d) said first supporting frame and said second supporting frame being positioned in side by side relationship with said first supporting frame in said full spool storage position and said second supporting frame in said splicing position;

(e) guide members for holding said trailing edge of said second spool and said leading edge of said first spool in position for splicing;

(f) a first one of said guide members being a fixed guide member positioned on said stationary support adjacent said second supporting frame in said splicing position for holding said trailing edge;

(g) a second one of said guide members being a moveable guide member mounted on said first supporting frame for movement relative to said first supporting frame to hold said leading edge;

(h) means mounted on said stationary support for moving said moveable guide member towards said fixed guide member to urge said leading edge of said first spool of strip material into splicing engagement with said trailing edge of said second spool of strip material and then away from the other guide member for releasing the splice between said leading edge of said first spool of strip material and said trailing edge of said second spool of strip material; and, (i) said moveable guide member having a clamp releasably mounted for holding said leading edge of said first spool of strip material on said moveable guide member in said full spool storage position and for releasing said leading edge as it is moved into engagement with said trailing edge of said second spool of strip material.

2. Apparatus in accordance with claim 1 wherein said first supporting frame and said second supporting frame are mounted in side by side relationship with a plurality of other spool supporting frame on an indexing carriage moveable between said full spool storage position, said empty spool storage position, and said splicing position and;

said supporting frames being pivotable about a common shaft mounted on said indexing carriage for tilting each of said frames away from said carriage to replace empty spools of strip material with full spools of strip material.

3. Apparatus in accordance with claim 1 wherein said fixed guide member has vacuum means for holding said trailing edge in place on said fixed guide member.

4. Apparatus in accordance with claim 1 including photoeye means for determining the position of said trailing edge and means for positioning said trailing edge on said stationary guide member.

5. Apparatus in accordance with claim 4 wherein said strip material from said first spool is pulled out of said first supporting frame by a drive roll connected to said stationary support and drive means for rotating said drive roll to control the movement of said trailing edge of said second spool of strip material in response to said signal from said photoeye means.

6. A method of splicing a leading edge of a first spool of strip material to a trailing edge of a second spool of strip material comprising:

(a) mounting said first spool on first supporting frame in a full spool storage position;

(b) mounting said second spool on a second supporting frame in a splicing position with said first supporting frame being in side by side relationship with said second supporting frame;

(c) releasably fastening said leading edge of said first spool of strip material to a frame guide member mounted on said first supporting frame for movement relative to said frame;

(d) rotatably said second spool and positioning said trailing edge of said second spool of strip material on a support guide member mounted on a stationary support in said splicing position;

(e) moving said second supporting frame from said splicing position into an empty spool storage position and moving said first supporting frame into said splicing position with said frame guide member spaced from said support guide member;

(f) moving said frame guide member and said support guide member together by means mounted on said stationary support to bring said leading edge into splicing engagement with said trailing edge;

(g) moving said frame guide member and said support guide member apart to permit movement of said spliced strip material; and (h) releasably clamping and holding said leading edge of said first spool of strip material to said frame guide member for movement into engagement with said trailing edge of said second spool of strip material and then releasing said leading edge after it is spliced to said trailing edge of said second spool of strip material.

7. The method of claim 6 including holding said trailing edge on said support guide member by vacuum means.

8. The method of claim 6 including determining the position of said trailing edge of said second spool of strip material by photoeye means so that said trailing edge can be positioned on said support guide member.

9. The method of claim 6 including releasably attaching said trailing edge of said second spool of strip material to said second spool.

10. The method of claim 6 wherein said first supporting frame and said second supporting frame are hingedly mounted on an indexing carriage for moving said first supporting frame and said second supporting frame between said full spool storage position, said empty spool storage position and said splicing position including tilting said first supporting frame and said second supporting frame on said carriage in said empty spool positions to replace an empty spool of strip material with a full spool of strip material.

* * * * *